(12) United States Patent  (10) Patent No.: US 8,884,990 B2
Villegas et al.  (45) Date of Patent: Nov. 11, 2014

(54) SCALING VECTOR OBJECTS HAVING ARBITRARILY COMPLEX SHAPES

(75) Inventors: Jethro Villegas, San Francisco, CA (US); Lee Thomason, Albany, CA (US); Michael Richards, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 934 days.

(21) Appl. No.: 11/519,438

(22) Filed: Sep. 11, 2006

(65) Prior Publication Data

US 2014/0300647 A1   Oct. 9, 2014

(51) Int. Cl.
*G06T 3/40*   (2006.01)

(52) U.S. Cl.
CPC ........................................ *G06T 3/40* (2013.01)
USPC ............................ 345/660; 345/661; 345/666

(58) Field of Classification Search
CPC ........................................................ G06T 3/40
USPC ................................. 345/621–624, 660–666
See application file for complete search history.

(56) References Cited

U.S. PATENT DOCUMENTS

| | | | |
|---|---|---|---|
| 7,292,242 B1 * | 11/2007 | Wittenbrink et al. | 345/421 |
| 7,453,474 B2 * | 11/2008 | Faraday et al. | 345/660 |
| 2004/0263537 A1 * | 12/2004 | Faraday et al. | 345/660 |

* cited by examiner

*Primary Examiner* — Jeffery A Brier
(74) *Attorney, Agent, or Firm* — Kilpatrick Townsend & Stockton LLP

(57) ABSTRACT

Scaling arbitrarily complex graphical objects is described by superimposing a grid of four guide lines on a graphical object defined by one or more vectors. The guide lines define nine grid sections. The graphical application development environment (GADE) divides any vectors crossing multiple grid sections into separate section vectors, such that each section contains whole vectors. The application and resulting vector information in each grid section is compiled into an executable file. When executed in a compatible run-time container, the container virtually renders a transformed representation of the graphical object in memory. Using information gathered from analyzing the outline of the transformed representation, the run-time container generates code blocks for transforming each of the vectors within the grid sections an appropriate amount that conforms to the outline information. The resulting transformed vectors are displayed in the running application.

28 Claims, 8 Drawing Sheets

SCALING VECTOR OBJECTS HAVING ARBITRARILY COMPLEX SHAPES

CROSS-REFERENCE TO RELATED APPLICATIONS

Not applicable.

TECHNICAL FIELD

The present invention relates, in general, to graphical application development environments, and, more specifically, to scaling vector objects having arbitrarily complex shapes.

BACKGROUND

The growth and popularity of computer applications and the Internet is due, in large part, to the vast improvements in the user experience of computers in general. Advances in graphics capabilities, processing speed, and transmission bandwidth have allowed the creation of applications and websites that provide the user rich graphical, interactive, and useful experiences. Graphical application development environments (GADEs), such as Adobe Incorporated Inc.'s FLASH®, FLEX®, and FLEX BUILDER®, Borland Software Corporation's DELPHI®, and the like, provide an environment for application developers to create and code complex graphically-driven applications.

In the development of a graphical application, the author or developer typically uses graphical tools to draw objects that may be later used as repeatable symbols, components, and the like. When used in an animation or movie, it may be desirable to allow the graphical object to change in size, shape, or both. There are many different methods for allowing for such graphical objects to change sizes and shapes. One such method that has been used in web design is dividing the graphical object into nine sections by slicing it with a grid comprising two sets of perpendicularly intersecting parallel lines. Specific ones of the resulting nine sections of the object are then scaled and/or transformed according to the section of the grid in which they are located. The corner sections of the grid are typically not scaled. The remaining sections are scaled in some manner to achieve the desired transformation of the overall object. Once these remaining sections are scaled the corner sections may be transformed and/or translated as necessary to end up adjacent to the remaining sections of the object. This transformation may include some scaling; however, scaling is rarely performed on the corners. This approach to creating size/shape-variable graphics is generally referred to as "nine slicing," "nine slice scaling," "scale nine," or "slice nine."

In order to implement nine slice scaling when developing a graphics-driven application, the developer graphically drags a grid on the object, but must then program all of the appropriate and/or desired scaling and transform code modules for each section of the grid. While this process may provides the desired scaling, it typically takes a great deal of time, effort, and expert programming and mathematics skills for the author to code the transformation matrices for each object being scaled and/or transformed. Moreover, when a developer is designing scalable components, they typically code everything about the component, including the graphics, without the use of grids or even the source graphics. Conventional graphics tools do not provide automated solutions to this problem because of the arbitrary complexity of the possible shapes that can be involved. Furthermore, the nine slice grid lines need not be symmetrical about any particular axis of the object, which can make any attempt to automate the process highly complex to implement.

In many GADEs, vector graphics are available for representing the various graphical objects. Vector graphics use geometrical primitives such as points, lines, curves, and polygons, which are all based upon mathematical equations to represent images in computer graphics. Vector graphics are often used because they can typically be moved, scaled, rotated, filled, and the like without degrading the quality of a drawing. Many vector graphics are represented by quadratic Bézier curves, which generally use three control points to define a curve: two end points and a third control point. When using vector graphics, an automated solution to nine slice scaling may be easier to implement because of the way such graphics are represented mathematically rather than by mapped bits. However, because the control points for each individual vector may not be within the same region, programming a scaling transformation module that will consistently affect the entire vector as it spans the different sections is computationally complex, which would be impractical to automate due to the near infinite possible object shapes, grid patterns, and combinations thereof that may be used.

An alternative that provides an easier means to automate a slice nine scaling is to render a bitmap of the object, if necessary, and then simply magnifying the bitmap using conventional magnification techniques. This approach may be handled automatically, but generally results in a less-pleasing graphical effect, because the magnification of the edges and corners of the object typically become noticeably altered. For example, an object with rounded corners that is magnified in this fashion can result in a "jagged" appearance. Therefore, while providing more of a means to automate a slice nine scaling technique, the results would actually diminish the user experience making it an undesirable process.

BRIEF SUMMARY

The present invention is directed to scaling arbitrarily complex graphical objects. A grid of four guide lines are superimposed on a graphical object defined by one or more vectors. A user of a graphical application development environment (GADE) can change the positioning of any of the guide lines in order to control how the graphical object will eventually transform. The resulting intersecting guide lines define nine grid sections that cover the underling graphical object. Either automatically or on the selection of a user, the GADE divides any overlapping vectors, i.e., vectors crossing multiple grid sections, into separate section vectors, such that each section contains whole vectors without any other overlapping vectors. The application and resulting vector information in each grid section is compiled into an executable file.

When executed in a compatible browser, media player, or other such run-time container, the player virtually renders a transformed representation of the graphical object in memory using the original vector control points compiled into the executable file along with the other information. The media player analyzes the edges or outline of the transformed representation and compiles information that will be used to generate code blocks for transforming the vectors within each of the grid sections. The transformation code is generated to ensure that the resulting transformed object conforms to the outline information from the transformed representation. Once all of the code blocks are generated, each code block is applied to the corresponding grid section to transform its vector contents. The resulting transformed vectors are displayed together in the running application and make up the transformed graphical object.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1:
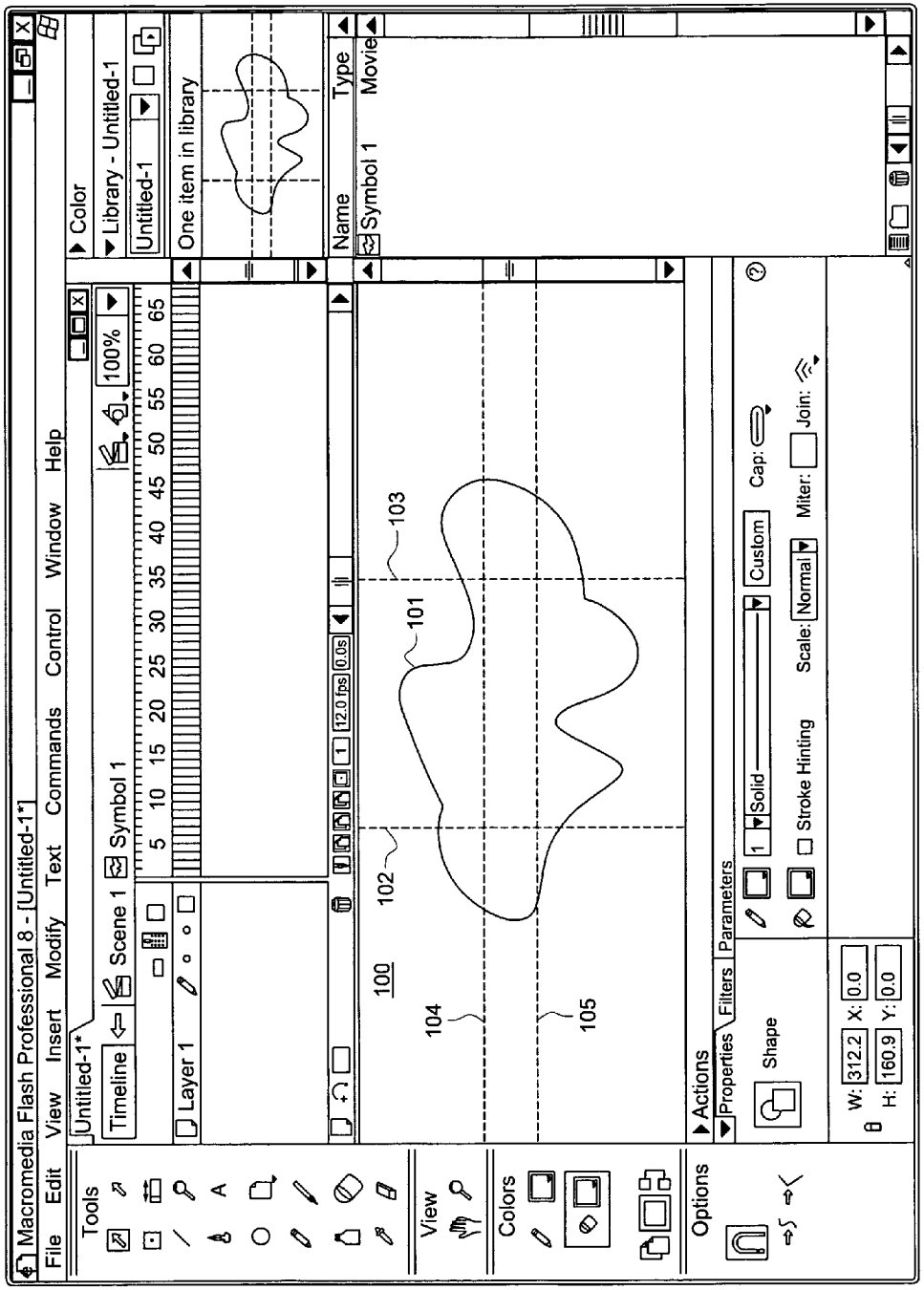
FIG. 1 is a screenshot illustrating a GADE configured according to one embodiment of the present invention.

FIG. 1 is a screenshot illustrating GADE 10 configured according to one embodiment of the present invention. In operation of GADE 10, a developer creates graphic 101 in design canvas 100. The designer selects to enable nine slice scaling. When selected, guide lines 102-105 are laid over graphic 101, visibly dividing graphic 101 into nine sections. The designer maintains full control over how graphic 101 is visibly divided by graphically manipulating any one of guide lines 102-105. GADE 10 allows the designer to move guide lines 102-103 horizontally and/or guide lines 104-105 vertically. The designer may then move any of guide lines 102-105 in order to affect how graphic 101 may be scaled or otherwise transformed.

Figure 2A:
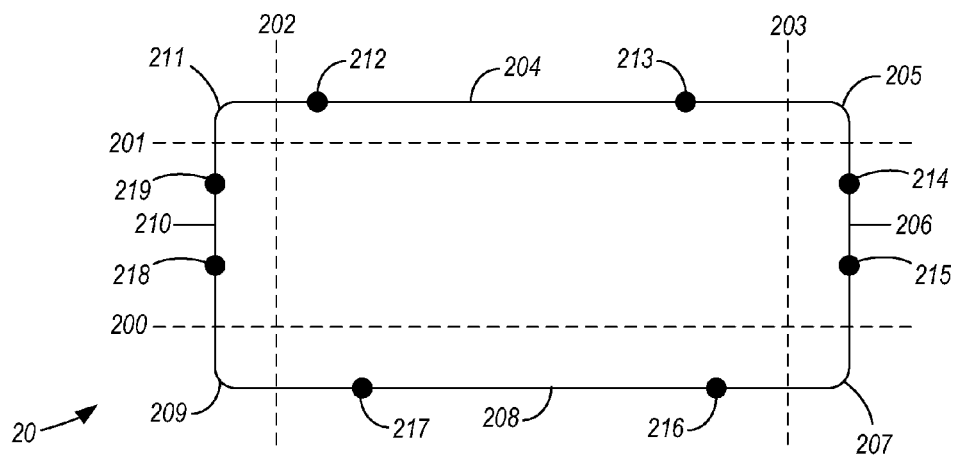
FIG. 2A is a diagram illustrating a button graphic set up for nine slice scaling in a GADE configured according to one embodiment of the present invention.

FIG. 2A is a diagram illustrating button graphic 20 initialized for nine slice scaling in a GADE configured according to one embodiment of the present invention. Some graphical objects, such as button graphic 20, are vector graphics made up of vectors 204-211 defined, in part, by end points 212-219. Guide lines 200-203 visibly divide button graphic 20 into nine section. Vectors 205, 207, 209, and 211 each cross multiple ones of guide lines 200-203 and, therefore, cannot be fully described within a single section of the nine slice grid. Each vector that crosses more than one grid section is considered an overlapping vector. Therefore, vectors 205, 207, 209, and 211 are each overlapping vectors.

Figure 2B:
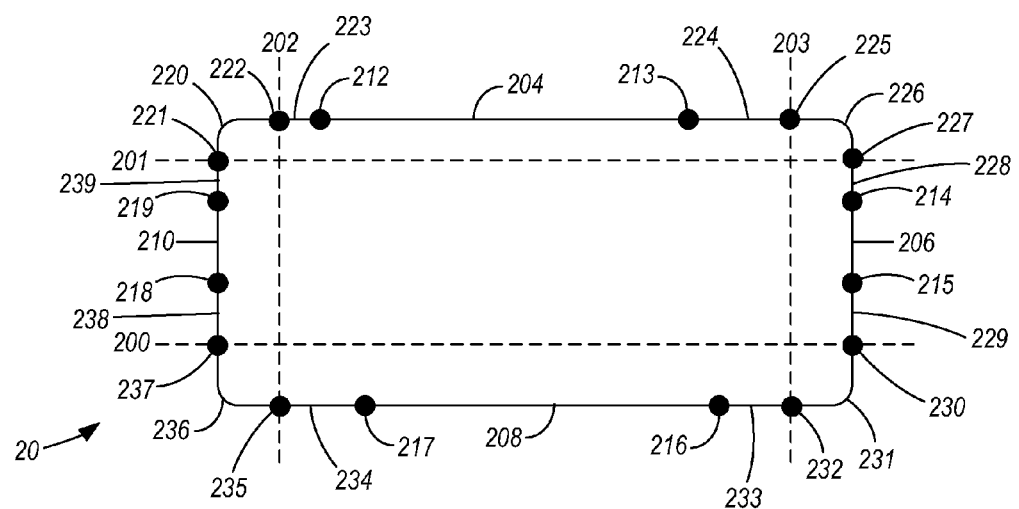
FIG. 2B is a diagram illustrating a button graphic modified for nine slice scaling in a GADE configured according to one embodiment of the present invention.

FIG. 2B is a diagram illustrating button graphic 20 modified for nine slice scaling in a GADE configured according to one embodiment of the present invention. When the designer saves button graphic 20 in the final media file or otherwise selects to prepare button graphic 20 for nine slice scaling, the GADE actually divides all of the overlapping vectors, i.e., the vectors that cross over any of the nine slice grid sections defined by guide lines 200-203. Thus, overlapping vectors, vectors 205, 207, 209, and 211, are divided into section vectors, such as vectors 220, 223, 224, 226, 228, 229, 231, 233, 234, 236, 238, and 239. The GADE inserts new end points 221, 222, 225, 227, 230, 232, 235, and 237 in creating the section vectors. It divides overlapping vectors, vectors 205, 207, 209, and 211, in order to have completely described whole vectors in each of the grid sections defined by guide lines 200-203.

It should be noted that while FIGS. 2A & 2B illustrate button graphic 20 as a rectangle with rounded corners, the present invention is not limited solely to rectangular vector graphics. Any object having any arbitrary graphical complexity may be prepared for scaling and scaled using embodiments of the present invention.

Figure 3:
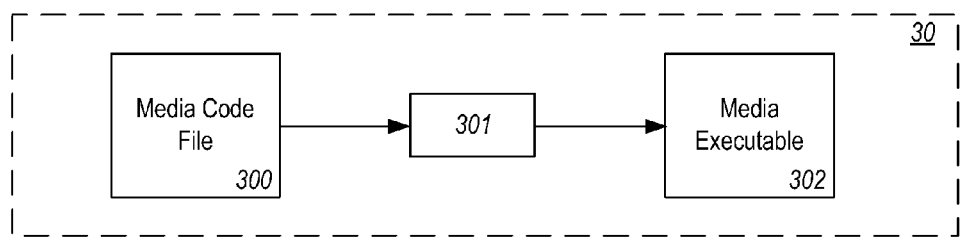
FIG. 3 is a block diagram illustrating a GADE configured according to one embodiment of the present invention.

FIG. 3 is a block diagram illustrating GADE 30 configured according to one embodiment of the present invention. GADE 30 provides a development environment for an application developer to design and code applications. GADE 30 is configured to create a media edit file, such as media code file 300, with the source material and source code that defines the application. Once the developer has completed the application, he or she selects to compile media code file 300 into media executable file 302 using compiler 301. Media executable file 302 may then be distributed to users for operation with any compatible player, browser, or other run-time container in order to execute the application.

It should be noted that while GADE 30 is illustrated with compiler 301 built into its features, GADEs implemented in additional and/or alternative embodiments of the present invention may operate without a built-in compiler. In such embodiments, the resulting media code file is compiled into an executable file using an external compiler.

When the developer finishes designing and coding the application in the GADE, the objects that have been set up for nine slice scaling are divided into nine separate sections, each with its own complete set of vectors making up that part of the object residing in that particular section. The actual scaling or transforming does not occur until the resulting executable file is run in the compatible media player and the display of the application is scaled or manipulated in some manner. The process performed in the GADE merely prepares the graphical object for any transformation that will occur in the browser, media player, or other run-time container for the media executable file.

Figure 4:
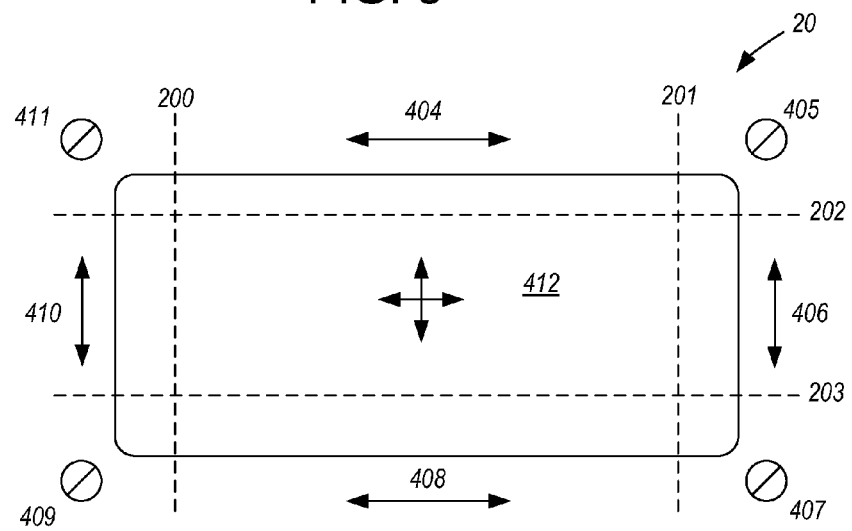
FIG. 4 is a diagram illustrating the nine slice sections of a button graphic used in a GADE configured according to one embodiment of the present invention.

FIG. 4 is a diagram illustrating nine slice sections 404-412 of button graphic 20 used in a GADE configured according to one embodiment of the present invention. Nine slice sections 404-412 are created by guide lines 200-203. When scaling is to occur, slice sections 404-412 each scale or not according to their own position in the nine slice grid. Corner slice sections 405, 407, 409, and 411 generally do not scale in either direction. Slice sections 404 and 408 scale horizontally, while slice sections 406 and 410 scale vertically. Slice section 412 may be scaled horizontally and/or vertically. If slice sections 404, 406, 408, 410, and 412 are scaled, corner slice sections 405, 407, 409, and 411 are translated/transformed to be adjacent to slice sections 404, 406, 408, 410, and 412, respectively.

Figure 5:
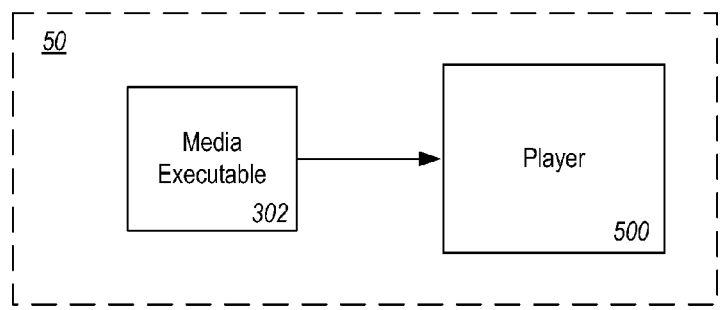
FIG. 5 is a block diagram illustrating a media player configured according to one embodiment of the present invention.

It should be noted that, while the illustrated embodiment of FIG. 5 shows scaling occurring in either or both of the horizontal and vertical directions, additional and/or alternative embodiments of the present invention may provide for nine slice grid lines that are oriented in a non-horizontal/non-vertical direction. In such embodiments, the scaling that occurs in the individual grid sections may occur either or both of a direction that is parallel to either or both sets of grid lines.

FIG. 5 is a block diagram illustrating media player 500 configured according to one embodiment of the present invention. A user at computer 50 desires to run a graphical application defined by media executable file 302. Media executable file 302 is downloaded or otherwise provided to computer 50. As the user selects to run the application, media player 500 starts and executes media executable file 302. Through its rendering engine, media player 500 executes and renders the visual components of media executable file 302 onto the display of computer 50 (not separately shown in FIG. 5).

Figure 6A:
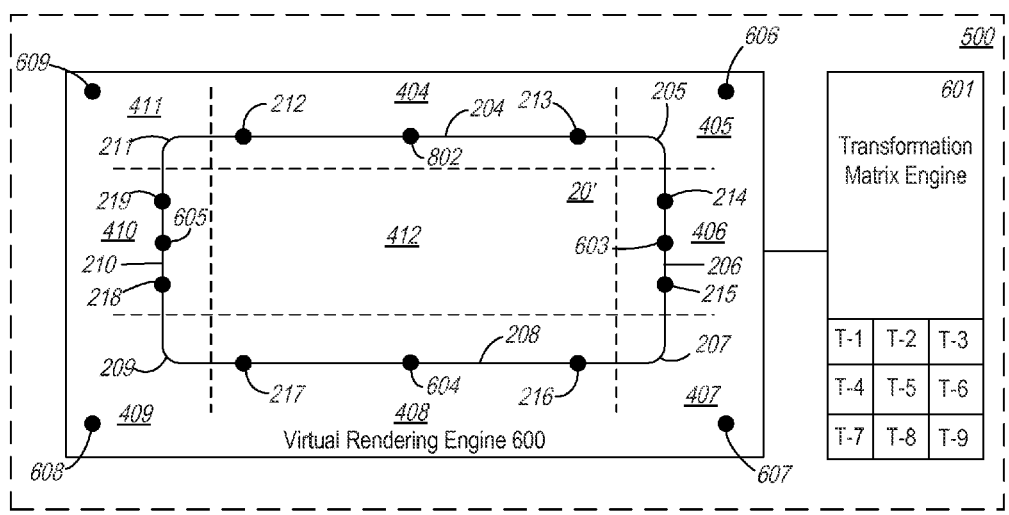
FIG. 6A is a block diagram illustrating a media player configured according to one embodiment of the present invention.

FIG. 6A is a block diagram illustrating media player 500 configured according to one embodiment of the present invention. In order to implement the nine slice scaling on button graphic 20 (FIGS. 2A & 2B), media player 500 generates transformation code matrices and calculations to apply to each of slice sections 404-412 using transformation matrix engine 601. However, in order to do so, media player 500 uses virtual rendering engine 600 to virtually render a scaled version of button graphic 20 (FIGS. 2A & 2B). The scaled version is illustrated as button graphic 20'. Media player 500 virtually renders button graphic 20' taking into consideration original vectors 204-211 defined by original endpoints 212-219 and control points 602-609, which are stored in media executable file 302 (FIG. 3). Media player 500 calculates and analyzes the outline or outer edge of button graphic 20' and determines, based on those virtually rendered outer edges, how each of the vectors residing in slice sections 404-411 should scale and render. The information gained regarding the outer edges during the virtual scaling performed by virtual rendering engine 600 and the positions of the outer edges of scaled button graphic 20' within slice sections 404-411 are delivered to transformation matrix engine 601 to calculate the transformation code matrix for each of slice section 404-411. The generated transformation code matrices for each slice section are stored as transformation code matrices T-1-T-9.

Figure 6B:
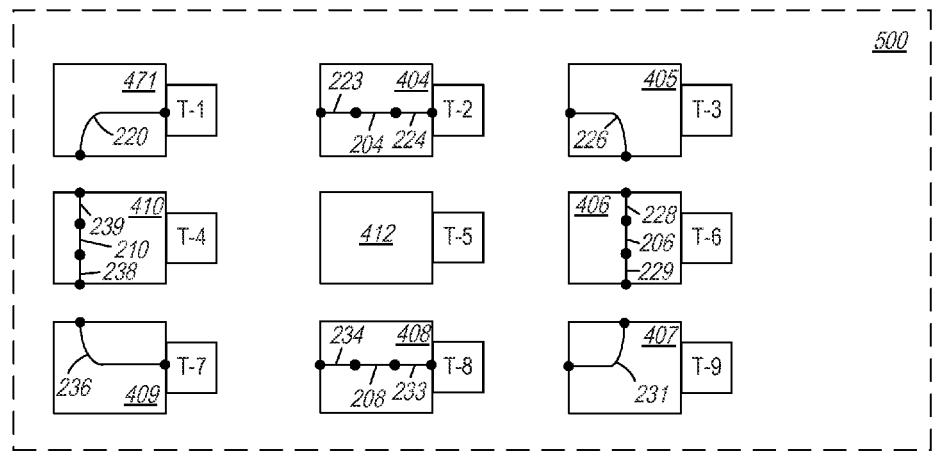
FIG. 6B is a block diagram illustrating a media player configured according to one embodiment of the present invention.
Figure 7:
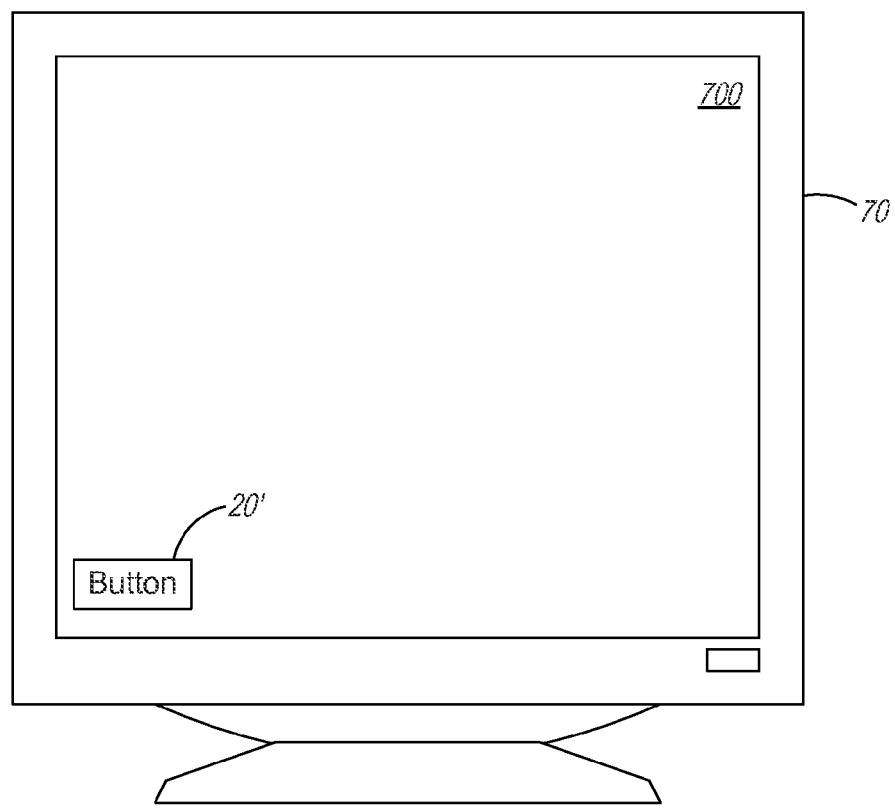
FIG. 7 is a diagram illustrating a display rendering an application with a scaled button graphic.

FIG. 6B is a block diagram illustrating media player 500 configured according to one embodiment of the present invention. Once the transformation code matrices are generated, media player 500 begins handling each of slice sections 404-412 along with each of the vectors contained within slice sections 404-411. Media player 500 begins with a first section, such as slice section 411, with vector 220. Media player 500 uses transformation code matrix T-1 to transform vector 220 to be adjacent to the scaled result of vectors 223 and 239. It then uses transformation code matrix T-2 to scale vectors 204, 223, and 224 horizontally in slice section 404. Media player 500 uses transformation code matrix T-3 to transform vector 226 in slice section 405 to be adjacent to the scaled results of vectors 224 and 228, and then uses transformation code matrix T-4 to scale vectors 210, 238, and 239 vertically in slice section 410. It uses transformation code matrix T-5 to scale slice section 412 both vertically and horizontally, while using transformation code matrix T-6 to scale vectors 206, 228, and 229 vertically in slice section 406. It uses transformation code matrix T-7 to transform vector 236 of slice section 409 to be adjacent to the scaled results of vectors 234 and 238, and then uses transformation code matrix T-8 to scale vectors 208, 233, and 234 horizontally in slice section 408. Media player 500 then uses transformation code matrix T-9 to transform vector 231 in slice section 407 to be adjacent to both of the scaled results of vectors 233 and 229. FIG. 7 is a diagram illustrating display 70 rendering application 700 with scaled button graphic 20', which results after media player 500 (FIG. 6B) uses each of transformation code matrices T-1-T-9 to scale and translate the vectors within slice sections 404-412 (FIG. 6B).

Figure 8:
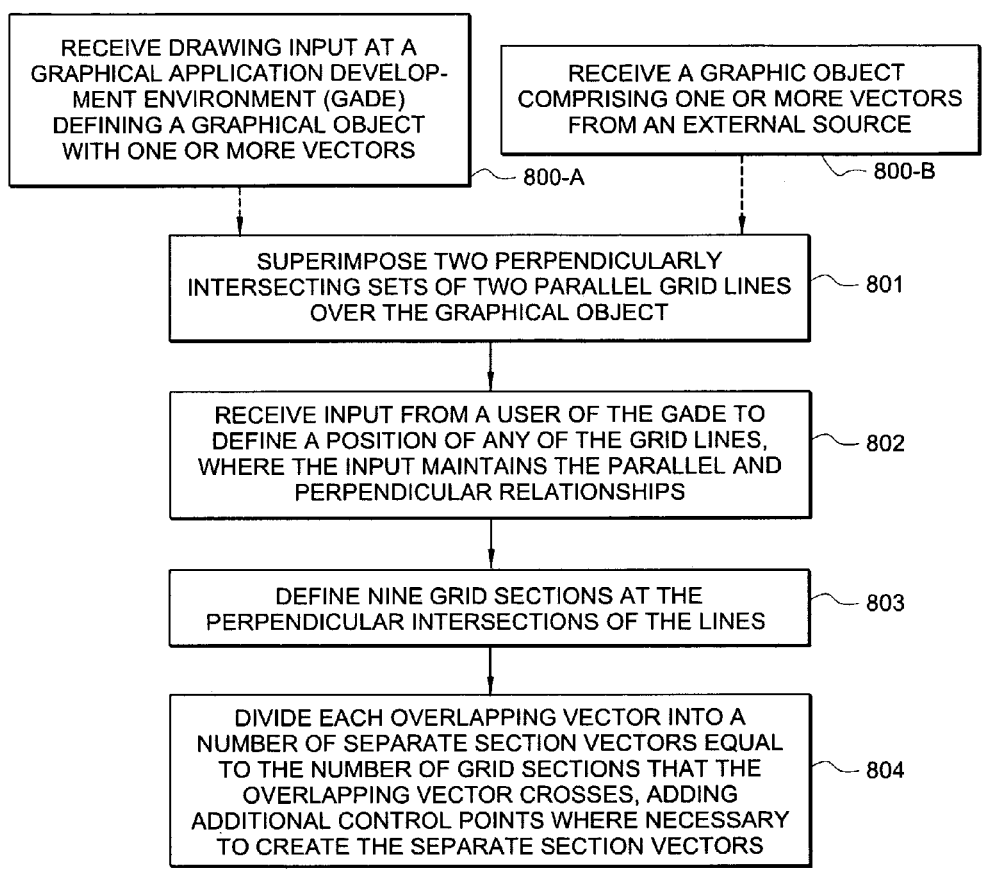
FIG. 8 is a flowchart illustrating example steps executed to implement one embodiment of the present invention.

FIG. 8 is a flowchart illustrating example steps executed to implement one embodiment of the present invention. In step 800-A, drawing input is received at a GADE defining a graphical object with one or more vectors. Alternatively, in step 800-B, a completed graphic object comprising one or more vectors is received from an external source. Two perpendicularly intersecting sets of two parallel grid lines are superimposed over the graphical object in step 801. Input is received from a user of the GADE, in step 802, to define a position of any of the grid lines, where the input maintains the parallel and perpendicular relationships. In step 803, nine grid sections are defined by the GADE at the perpendicular intersections of the lines. Each overlapping vector is divided, in step 804, into a number of separate section vectors equal to the number of grid sections that the overlapping vector crosses, where the GADE adds any additional control points necessary to create the separate section vectors.

Figure 9:
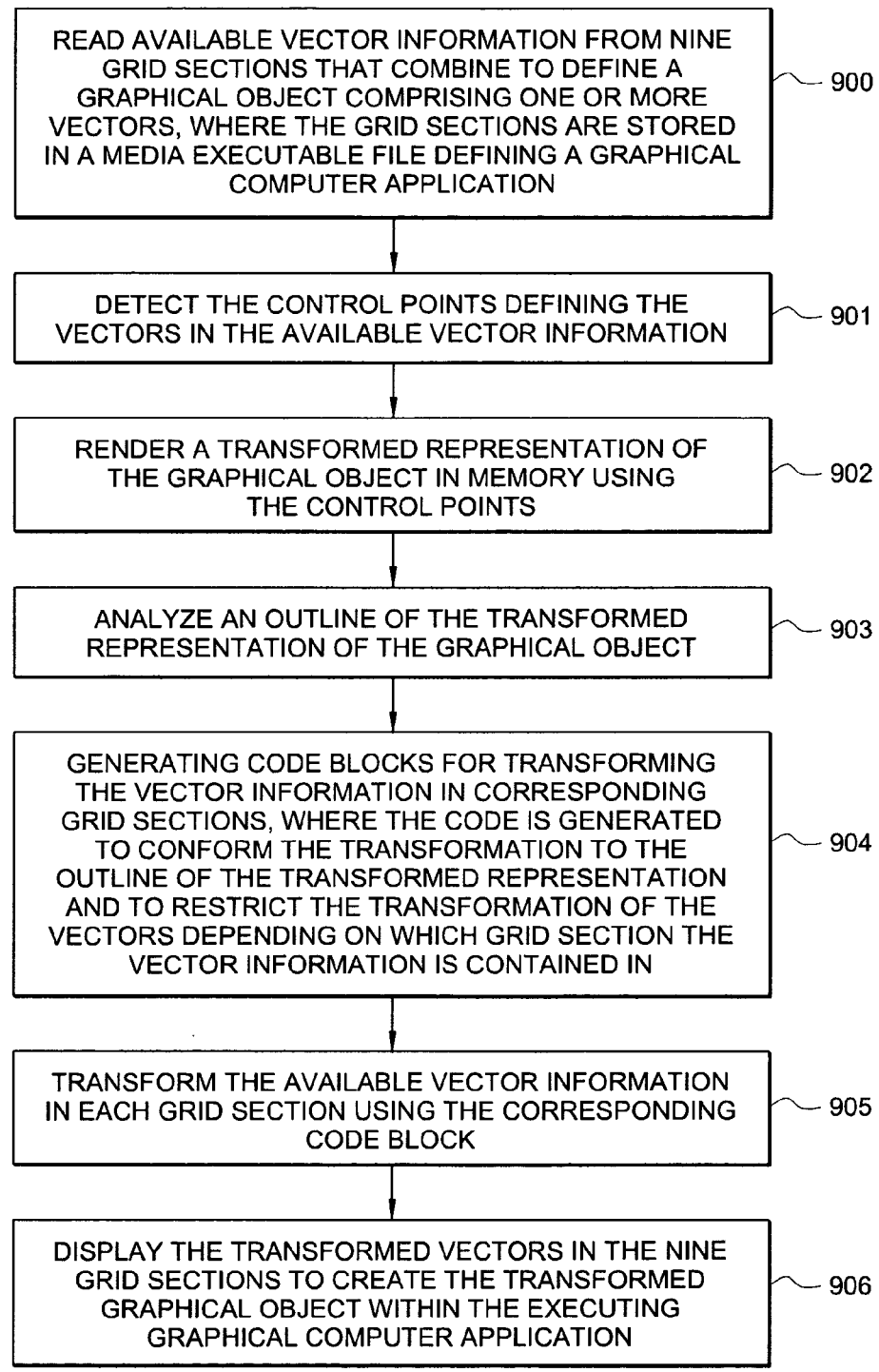
FIG. 9 is a flowchart illustrating example steps executed to implement one embodiment of the present invention.

Once the graphical application, including the nine slice objects, are packaged into an executable file, it may be transmitted or otherwise provided to any compatible run-time container or player. FIG. 9 is a flowchart illustrating example steps executed to implement one embodiment of the present invention. In step 900, available vector information, which includes vector control points, is read in the executable file from nine grid sections that combine to define a graphical object comprising one or more vectors. The control points defining the vectors are detected in the available vector information in step 901. A transformed representation of the graphical object is rendered in memory, in step 902, using the control points. An edge or outline of the transformed representation of the graphical object is analyzed in step 903. Code blocks for transforming the vector information in corresponding grid sections are generated, in step 904, where the code is generated to not only conform the transformation to the outline of the transformed representation but also to restrict the transformation direction of the vectors according to which grid section the vector information is contained in. The available vector information in each grid section is transformed, in step 905, using the corresponding code block. In step 906, the transformed vectors in the nine grid sections are displayed to create the transformed graphical object within the executing graphical computer application.

It should be noted that the embodiment of the present invention described with respect to FIG. 9 describes nine slice scaling regardless of whether the vectors making up the graphical object are separated into section vectors, which was described with regard to the embodiment illustrated in FIGS. 6A and 6B, or whether the vectors are overlapping vectors. In the code generating step 904, the code is generated to conform to the outline or edge of the transformed representation and also restricted according to the location of the grid section that the vector information, including the control points, are located. Therefore, the run-time container or player analyzes where each control point is in the different grid sections and generates a different transform for that control point that will cause the resulting transformed object to conform to the outline or edge of the transformed representation. The result causes a different transform to be applied to the different control points of the same vector to achieve the appropriate transformed result. If, as the embodiment in FIGS. 6A and 6B describe, the media executable file being run by the player embodiment described in FIG. 9 includes vectors that have been divided into section vectors, thereby eliminating overlapping vectors, the FIG. 9 player still analyzes the edge or outline of the transformed representation using the original control points, but now can apply the same transformation to all of the control points of any particular vector because each grid section will contain only completely described vectors. The results of the transformation using the divided vectors will produce a sharper transformed result than that of the overlapping vectors; however, the FIG. 9 player embodiment allows for greater flexibility in handling media executable files.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 10:
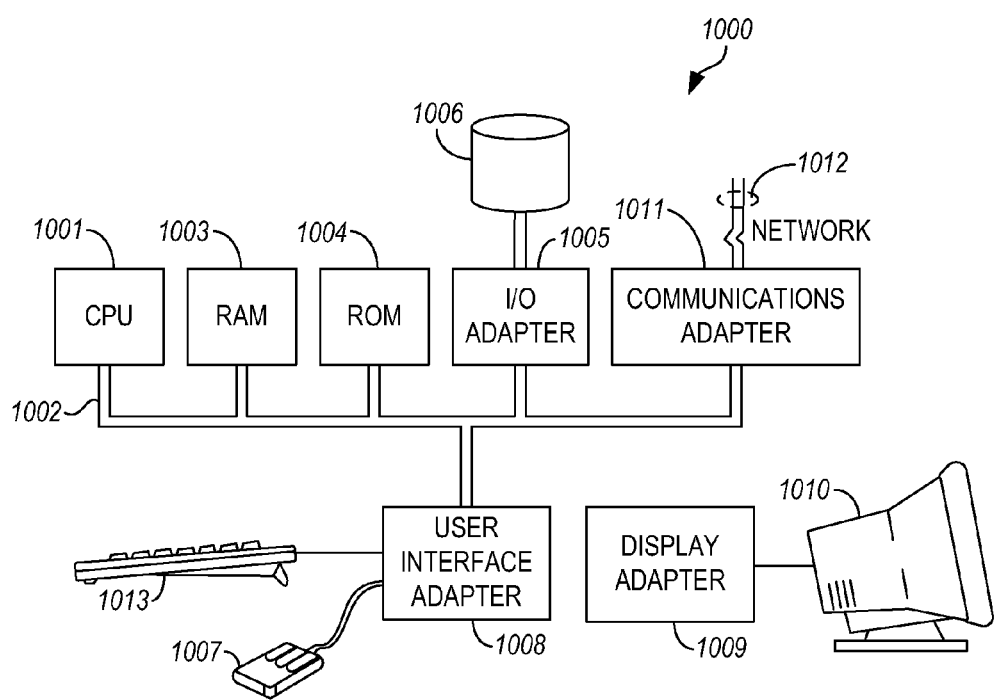
FIG. 10 illustrates computer system 1000 adapted to use embodiments of the present invention

FIG. 10 illustrates computer system 1000 adapted to use embodiments of the present invention, e.g. storing and/or executing software associated with the embodiments. Central processing unit (CPU) 1001 is coupled to system bus 1002. The CPU 1001 may be any general purpose CPU. However, embodiments of the present invention are not restricted by the architecture of CPU 1001 as long as CPU 1001 supports the inventive operations as described herein. Bus 1002 is coupled to random access memory (RAM) 1003, which may be SRAM, DRAM, or SDRAM. ROM 1004 is also coupled to bus 1002, which may be PROM, EPROM, or EEPROM. RAM 1003 and ROM 1004 hold user and system data and programs as is well known in the art.

Bus 1002 is also coupled to input/output (I/O) controller card 1005, communications adapter card 1011, user interface card 1008, and display card 1009. The I/O adapter card 1005 connects storage devices 1006, such as one or more of a hard drive, a CD drive, a floppy disk drive, a tape drive, to computer system 1000. The I/O adapter 1005 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 1011 is adapted to couple the computer system 1000 to a network 1012, which may be one or more of a telephone network, a local (LAN) and/or a wide-area (WAN) network, an Ethernet network, and/or the Internet network. User interface card 1008 couples user input devices, such as keyboard 1013, pointing device 1007, and the like, to the computer system 1000. The display card 1009 is driven by CPU 1001 to control the display on display device 1010.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer-implemented method comprising:
    superimposing two sets of two parallel grid lines over a graphical object defined by one or more vectors displayed on a display of a computer system providing a graphical application development environment (GADE), wherein the computer system providing the GADE performs the superimposing and wherein a first set of said two sets perpendicularly intersect a second set of said two sets;
    the computer system providing the GADE defining nine grid sections defined by said perpendicular intersection of said two sets; and
    responsive to said superimposing, the computer system providing the GADE preparing the graphical object for grid section specific transformations within a graphical application created by the GADE by dividing each overlapping vector into a number of section vectors equal to a count of said nine grid sections that said overlapping vector crosses, wherein a result of said dividing eliminates said each overlapping vector.

2. The method of claim 1 further comprising:
    receiving input from a user of said GADE to define a position of each one of said two sets of parallel grid lines.

3. The method of claim 2 wherein said position maintains one or more of:
    a parallelism of at least one of said two sets of two parallel grid lines; and
    said perpendicular intersection of said two sets.

4. The method of claim 1 further comprising:
receiving drawing input at said GADE defining said graphical object.

5. The method of claim 1 further comprising:
receiving said graphic object from an external source.

6. The method of claim 1 further comprising:
storing in a media source code file one or more of:
said nine grid sections;
said one or more vectors;
said number of section vectors; and,
one or more original control points defining said one or more vectors;
wherein said media source code file defines a graphical application.

7. The method of claim 6 further comprising:
compiling said media source code file into a media executable file.

8. The method of claim 7 further comprising:
providing said media executable file for execution to one or more of:
a web browser;
a media player; and
a run time container.

9. The method of claim 1, further comprising:
automatically adding control points to create said number of section vectors.

10. A non-transitory computer readable medium with computer executable code encoded thereon, said computer readable medium comprising:
code for superimposing two sets of two parallel grid lines over a graphical object defined by one or more vectors displayed on a display of a computer system providing a graphical application development environment (GADE), wherein the computer system providing the GADE performs the superimposing and wherein a first set of said two sets perpendicularly intersect a second set of said two sets;
code for defining nine, by the computer system providing the GADE, grid sections created by said perpendicular intersection of said two sets; and
code, executable in response to execution of said code for superimposing, for dividing, by the computer system providing the GADE, each overlapping vector into a number of section vectors equal to a count of said nine grid sections that said overlapping vector crosses, wherein a result of executing said code for dividing eliminates said each overlapping vector.

11. The non-transitory computer readable medium of claim 10 further comprising:
code for receiving input from a user of said GADE to define a position of each one of said two sets of parallel grid lines.

12. The non-transitory computer readable medium of claim 11 wherein said position maintains one or more of:
a parallelism of at least one of said two sets of two parallel grid lines; and
said perpendicular intersection of said two sets.

13. The non-transitory computer readable medium of claim 10 further comprising:
code for receiving drawing input at said GADE defining said graphical object.

14. The non-transitory computer readable medium of claim 10 further comprising:
code for receiving said graphic object from an external source.

15. The non-transitory computer readable medium of claim 10 further comprising:
code for storing in a media source code file one or more of:
said nine grid sections;
said one or more vectors;
said number of section vectors; and
one or more original control points defining said one or more vectors;
wherein said media source code file defines a graphical application.

16. The non-transitory computer readable medium of claim 15 further comprising:
code for compiling said media source code file into a media executable file.

17. The non-transitory computer readable medium of claim 16 further comprising:
code for providing said media executable file tier execution to one or more of:
a web browser;
a media player; and
a run time container.

18. The non-transitory computer readable medium of claim 10 further comprising:
code for automatically adding control points to create said number of section vectors.

19. A computer-implemented method comprising:
overlaying a grid onto a graphical object made up of one or more vectors in a computer system providing a graphical application development environment (GADE), wherein the computer system providing the GADE performs the overlaying and wherein said grid comprises two sets of two parallel lines with each set intersecting perpendicularly; and
the computer system providing the GADE preparing the graphical object for grid section specific transformations within a graphical application created by the GADE by dividing each overlapping vector into a number of section vectors according to each of nine grid sections crossed by said overlapping vector, wherein said nine grid sections are formed at said perpendicular intersection of said two sets of two parallel lines.

20. The method of claim 19 further comprising:
receiving input to change position of anyone of said two sets of two parallel lines; and
restricting said input to preserve one or more of:
a parallelism of at least one of said two sets; and
said perpendicular intersection of each set.

21. The method of claim 19 further comprising:
automatically adding one or more control points to create said number of section vectors.

22. The method of claim 19 further comprising one or more of:
receiving drawing input from a user of said GADE to create said graphical object; and
receiving said graphical object from an external source.

23. The method of claim 19 further comprising:
storing vector information associated with each of said nine grid sections for one or more of:
said one or more vectors; and
said number of section vectors;
that are located in said each of said nine grid sections.

24. A computer system comprising:
a processor configured to execute instructions stored in memory to perform steps comprising:
placing a grid onto a graphical object made up of one or more vectors in the computer system, the computer system providing a graphical application development environment (GADE), wherein the computer system providing the GADE performs the placing and wherein said grid comprises two sets of two parallel lines with each set intersecting perpendicularly; and preparing, by the computer system providing the GADE, the graphical object for grid section specific transformations within a graphical application created by the GADE by dividing each overlapping vector into a number of section vectors according to each of nine grid sections crossed by said overlapping vector, wherein said nine grid sections are formed at said perpendicular intersection of said two sets of two parallel lines.

25. The computer system of claim 24 wherein the steps further comprise:

receiving input to change position of anyone of said two sets of two parallel lines; and restricting said input to preserve one or more of:
a parallelism of at least one of said two sets; and
said perpendicular intersection of each set.

26. The computer system of claim 24 wherein the steps further comprise:

automatically adding one or more control points to create said number of section vectors.

27. The computer system of claim 24 wherein the steps further comprise:

receiving drawing input from a user of said GADE to create said graphical object; and receiving said graphical object from an external source.

28. The computer system of claim 24 wherein the steps further comprise:

storing vector information associated with each of said nine grid sections for one or more of:
said one or more vectors; and
said number of section vectors;
that are located in said each of said nine grid sections.

* * * * *